United States Patent
Peng et al.

(10) Patent No.: US 9,670,653 B2
(45) Date of Patent: Jun. 6, 2017

(54) CARTRIDGE TYPE VALVE CORE STRUCTURE OF WATER TAP

(71) Applicants: Lianhua Mao, Xiamen (CN); Huiru Zhao, Taichung (TW); Kesheng Peng, Xiamen (CN); HARDA (XIAMEN) PLASTIC CO., LTD., Xiamen (CN)

(72) Inventors: Kesheng Peng, Xiamen (CN); Lianhua Mao, Xiamen (CN); Huiru Zhao, Taichung (TW)

(73) Assignees: Lianhua Mao, Xiamen, Fujian (CN); Huiru Zhao, Taichung (TW); Kesheng Peng, Xiamen, Fujian (CN); HARDA (XIAMEN) PLASTIC CO., LTD., Xiamen, Fujian (CN)

( * ) Notice: Subject to any disclaimer, the term of this patent is extended or adjusted under 35 U.S.C. 154(b) by 0 days.

(21) Appl. No.: 14/745,468

(22) Filed: Jun. 22, 2015

(65) Prior Publication Data
US 2016/0369484 A1  Dec. 22, 2016

(51) Int. Cl.
  *F16K 25/00* (2006.01)
  *E03C 1/02* (2006.01)
  *F16K 11/02* (2006.01)

(52) U.S. Cl.
  CPC .............. *E03C 1/02* (2013.01); *F16K 11/02* (2013.01)

(58) Field of Classification Search
  CPC ......... Y10T 137/6014; Y10T 137/9464; E03C 1/0403; E03C 1/0404; E03C 1/02; F16K 19/006

USPC ... 137/315.11, 315.12, 315.13, 454.2, 454.6, 137/603, 801
  See application file for complete search history.

(56) References Cited

U.S. PATENT DOCUMENTS

| | | | | | |
|---|---|---|---|---|---|
| 4,481,971 | A | * | 11/1984 | Farrell | F16K 21/04 137/315.05 |
| 4,979,539 | A | * | 12/1990 | Rohr | E03C 1/0403 137/454.6 |
| 6,009,904 | A | * | 1/2000 | Yang | E03C 1/0404 137/119.05 |
| 6,386,226 | B1 | * | 5/2002 | Lopp | F16K 11/0787 137/315.13 |
| 8,567,429 | B2 | * | 10/2013 | Lin | F16K 11/0743 137/315.11 |
| 2011/0284112 | A1 | * | 11/2011 | Wang | E03C 1/04 137/801 |
| 2012/0018009 | A1 | * | 1/2012 | Veros | E03C 1/04 137/454.2 |

* cited by examiner

*Primary Examiner* — Reinaldo Sanchez-Medina
(74) *Attorney, Agent, or Firm* — Leong C. Lei (57) ABSTRACT

A cartridge type valve core structure of a water tap includes a cartridge casing and a valve core. The cartridge casing has an accommodation room therein. An outer wall of the cartridge casing is provided with a first engaging portion for connecting with the water tap. The valve core is disposed in the accommodation room. The valve core includes a control end, a water inlet end, a water outlet end, and at least one water room. The control end extends out of the cartridge casing from a top end of the accommodation room. The water inlet end extends out of the cartridge casing from a bottom end of the accommodation room. The water outlet end extends out of the cartridge casing from one side of the accommodation room. Through the aforesaid modular structure, the valve core can be mounted to the water tap quickly through the cartridge casing.

6 Claims, 8 Drawing Sheets

FIG. 8

CARTRIDGE TYPE VALVE CORE STRUCTURE OF WATER TAP

BACKGROUND OF THE INVENTION (a) Technical Field of the Invention

The present invention relates to a water tap, and more particularly to a cartridge type valve core structure of a water tap.

(b) Description of the Prior Art

A conventional water tap comprises a metallic outer casing. The metallic outer casing is formed with an accommodation room or a channel for water to flow therethrough by various processing means. However, for a metallic material, the processing procedure is more complicated and the processing cost is high. Besides, when the water tap is assembled, it is necessary to mount the parts, such as a control valve or the like, in the aforesaid casing one by one. The assembly is difficult and time-consuming. On the other hand, because the metallic product is direct contact with the water flow, it may liberate toxicity to influence the user's health. Accordingly, the present invention intends to provide a dual faucet structure for improving the shortcomings mentioned above.

SUMMARY OF THE INVENTION

The primary object of the present invention is to provide a cartridge type valve core structure of a water tap which can be assembled quickly.

In order to achieve the aforesaid object, the cartridge type valve core structure of a water tap of the present invention comprises a cartridge casing and a valve core. The cartridge casing has an accommodation room therein. An outer wall of the cartridge casing is provided with a first engaging portion for connecting with the water tap. The valve core is disposed in the accommodation room of the cartridge casing. The valve core comprises a control end, a water inlet end, a water outlet end, and at least one water room. The control end, the water inlet end and the water outlet end are connected to the water room, respectively. The control end extends out of the cartridge casing from a top end of the accommodation room. The water inlet end extends out of the cartridge casing from a bottom end of the accommodation room. The water outlet end extends out of the cartridge casing from one side of the accommodation room.

Preferably, the water tap is provided with a mounting space for the cartridge casing to be mounted therein. The mounting space is provided with a second engaging portion therein. The first engaging portion of the cartridge casing and the second engaging portion of the mounting space are a groove and a protrusion to engage with each other.

Preferably, the mounting space is disposed at a rear side of the water tap.

Preferably, the valve core has two water rooms. The water inlet end is provided with two water inlet pipes connected to the two water rooms, respectively. The two water inlet pipes are adapted to flow cool water and hot water. The control end is adapted to control the two water rooms to supply the cool water or hot water separately or to supply mixed water.

Preferably, the cartridge casing and the valve core are made of a nontoxic non-metal material.

Preferably, the cartridge casing is made of a transparent material.

Preferably, an outer surface of the cartridge casing is provided with an electroplating layer.

Accordingly, the valve core and the cartridge casing of the present invention constitute a module which is beneficial for assembly of the water tap. By the first engaging portion of the cartridge casing to engage with the second engaging portion of the mounting space of the water tap quickly, the assembly is completed. Therefore, the present invention can lower the difficulty in construction and save the time of assembly.

In addition, both the cartridge casing and the valve core are made of a nontoxic non-metal material, that is to say, the portion to contact with the water flow is non-metal. This prevents acid water from eroding metal to liberate toxicity.

DETAILED DESCRIPTION OF THE PREFERRED EMBODIMENTS

Embodiments of the present invention will now be described, by way of example only, with reference to the accompanying drawings.

Figure 1:
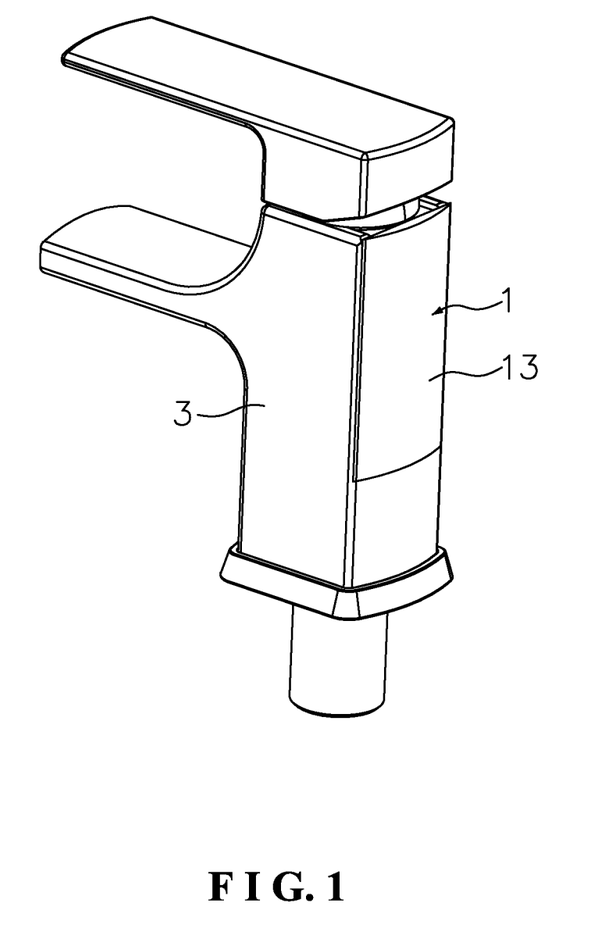
FIG. 1 is a perspective view according to a first embodiment of the present invention.
Figure 2:
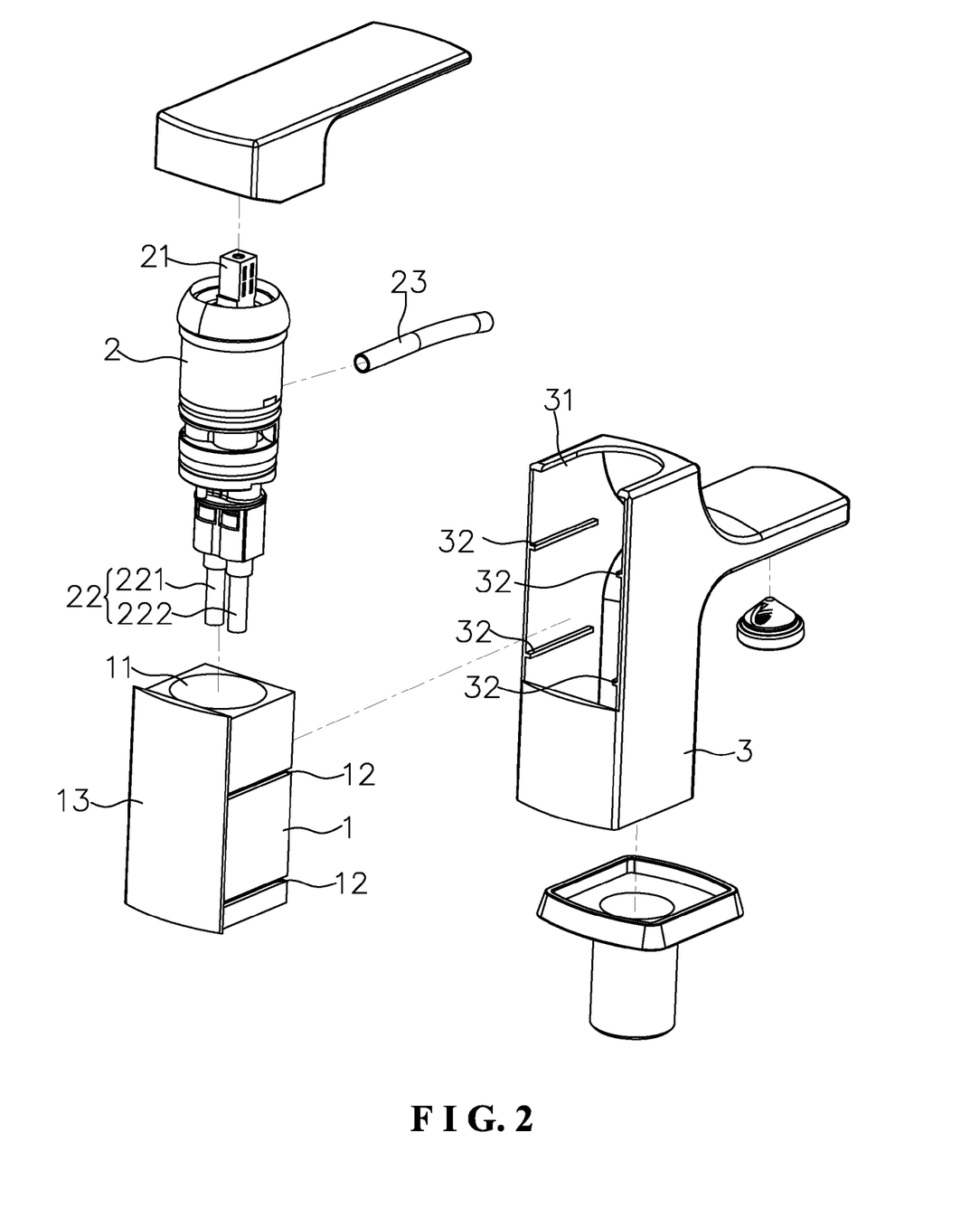
FIG. 2 is an exploded view according to the first embodiment of the present invention.
Figure 3:
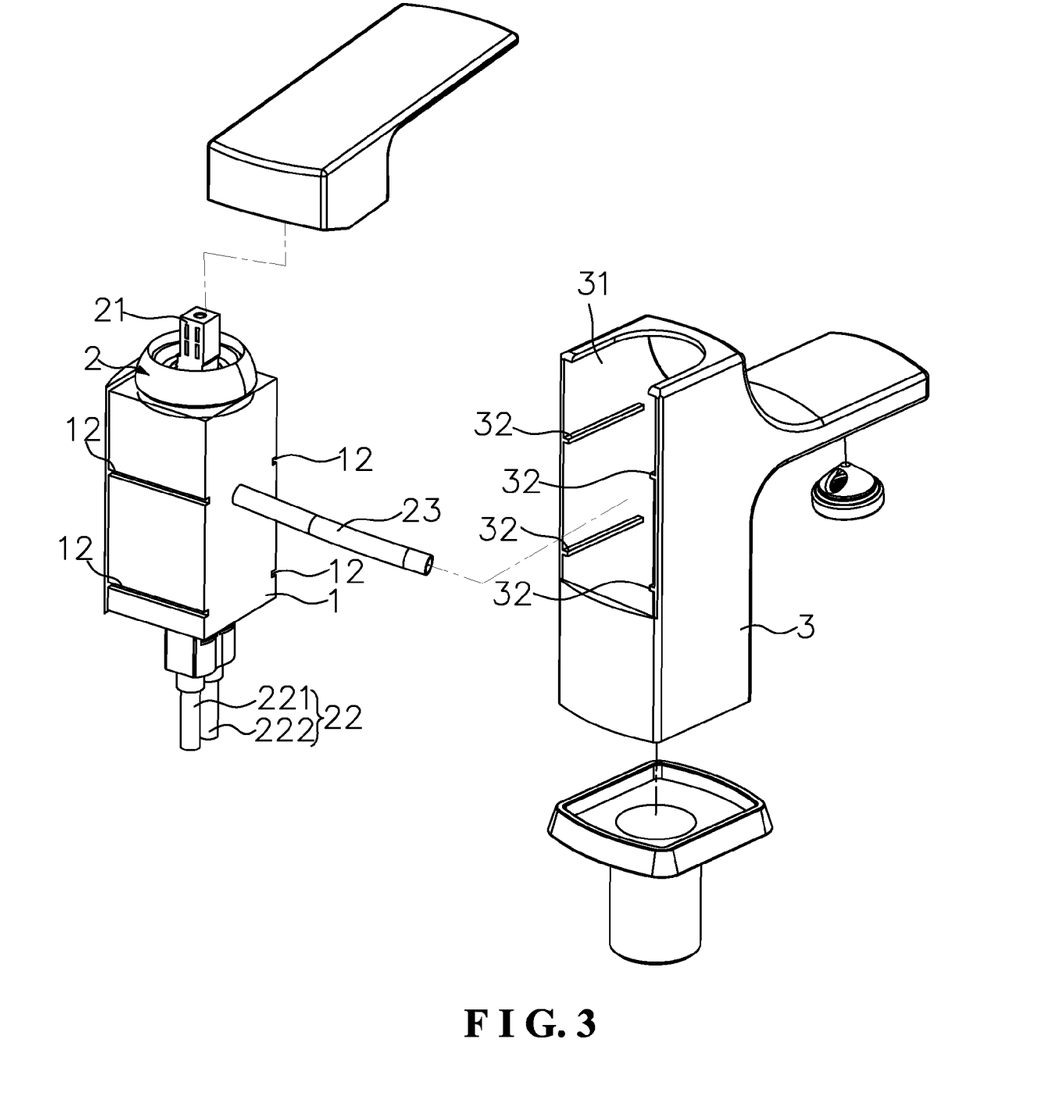
FIG. 3 is a partial assembled view according to the first embodiment of the present invention.

As shown in FIG. 1 through FIG. 3, a cartridge type valve core structure of a water tap according to a first embodiment of the present invention comprises a cartridge casing 1 and a valve core 2. Both the cartridge casing 1 and the valve core 2 are made of a nontoxic non-metal material. The cartridge casing 1 has an accommodation room 11 therein. The accommodation room 11 penetrates through the top and bottom ends of the cartridge casing 1. The outer wall of the cartridge casing 1 is provided with a first engaging portion 12 for connecting with a water tap 3. In particular, the rear side of the water tap 3 is provided with a mounting space 31 for the cartridge casing 1 to be mounted therein. The mounting space 31 is provided with a second engaging portion 32 therein. The first engaging portion 12 of the cartridge casing 1 is engaged with the second engaging portion 32 of the mounting space 31, such that the cartridge casing 1 is fixed to the mounting space 31. The first engaging portion 12 of the cartridge casing 1 and the second engaging portion 32 of the mounting space 31 are a groove and a protrusion, respectively, to engage with each other. In this embodiment, the first engaging portion 12 is a groove. The second engaging portion 32 is a protrusion. Thereby, the cartridge casing 1 is mounted into the mounting space 31 from the rear side of the water tap 3 through the groove and the protrusion to engage with each other. The cartridge casing 1 has an outer surface 13 exposed out of the rear side of the water tap 3. The outer surface 13 is electroplated with an electroplating layer so as to have the same metallic color as the water tap 3. In another embodiment, the cartridge casing 1 is made of a transparent material.

The valve core 2 is also made of a nontoxic non-metal material and disposed in the accommodation room 11 of the cartridge casing 1. The valve core 2 comprises a control end 21, a water inlet end 22, a water outlet end 23, and at least one water room (not shown in the drawings). In this embodiment, the valve core 2 has two water rooms. The water inlet end 22 is provided with two water inlet pipes 221, 222 connected to the two water rooms respectively. The two water inlet pipes 221, 222 are adapted to supply cool water and hot water to flow into the two water rooms, such that the two water rooms form a cool water room and a hot water room, respectively. The outer outlet end 23 is connected with the two water rooms and extends outward. The control end 21 is connected to the two water rooms for controlling the two water rooms to supply cool water or hot water separately or mixed water to flow out from the water outlet end 23. The water can be adjusted to be hot water, cool water, or warm water. The control end 21 extends out of the cartridge casing 1 from the top end of the accommodation room 11. The water inlet end 22 extends out of the cartridge casing 1 from the bottom end of the accommodation room 11. The water outlet end 23 extends out of the cartridge casing 1 from one side of the accommodation room 11.

Through the aforesaid structure, the valve core 1 and the cartridge casing 1 of the present invention constitute a module which is beneficial for assembly of the water tap 3. By the first engaging portion 12 of the cartridge casing 1 to engage with the second engaging portion 32 of the mounting space 31 of the water tap 3 quickly, the assembly is completed. Thereby, the present invention can lower the difficulty in construction and save the time of assembly. On the other hand, both the cartridge casing 1 and the valve core 2 are made of a nontoxic non-metal material, that is to say, the portion to contact with the water flow is non-metal. This prevents acid water from eroding metal to liberate toxicity.

Figure 4:
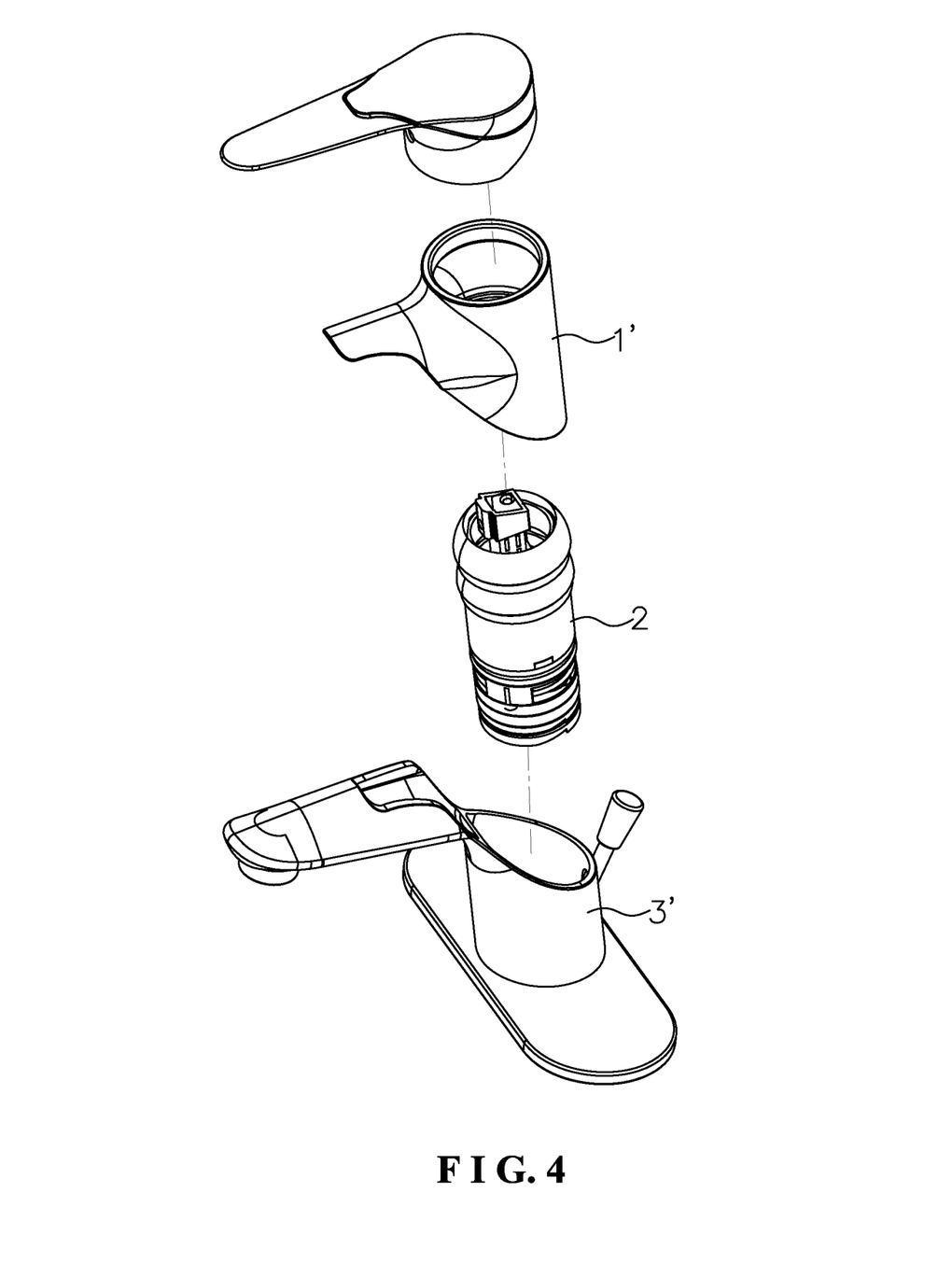
FIG. 4 is an exploded view according to a second embodiment of the present invention.
Figure 5:
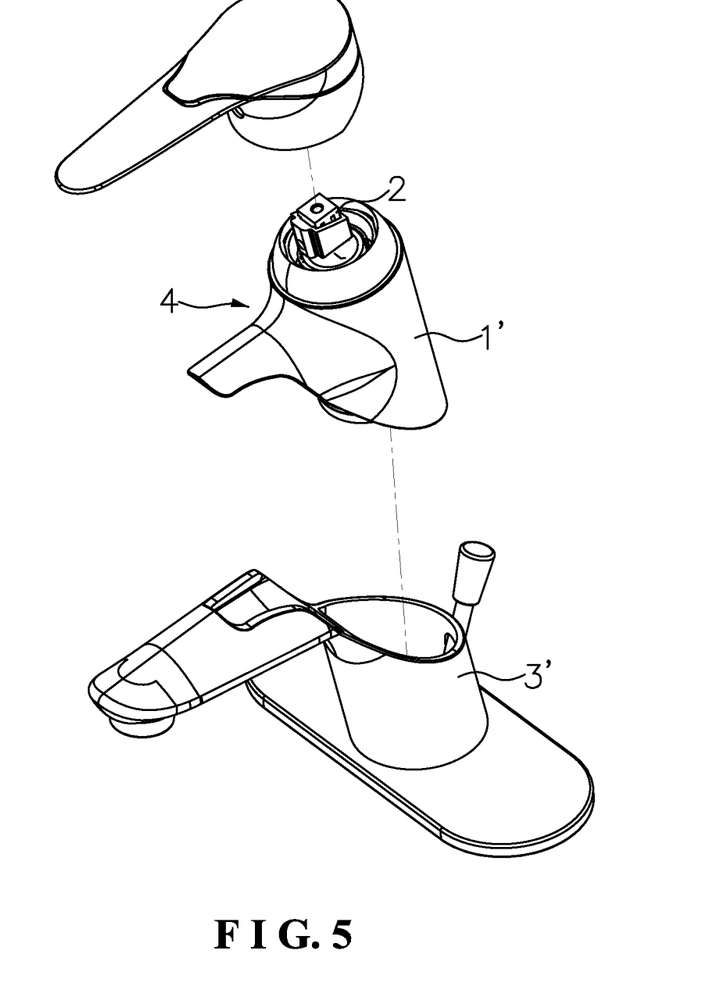
FIG. 5 is a partial assembled view according to the second embodiment of the present invention.

FIG. 4 and FIG. 5 show a second embodiment of the present invention.

The second embodiment is substantially similar to the first embodiment with the exceptions described hereinafter to achieve the same effects. In the second embodiment, the cartridge casing 1' corresponds in shape to the water tap 3'. After the valve core 2 is assembled to the cartridge casing 1' to form a module 4, the module 4 is mounted to the water tap 3'. The cartridge casing 1' corresponds in shape to the water tap 3' to form a smooth curve appearance to enhance the aesthetics and decoration.

Figure 6:
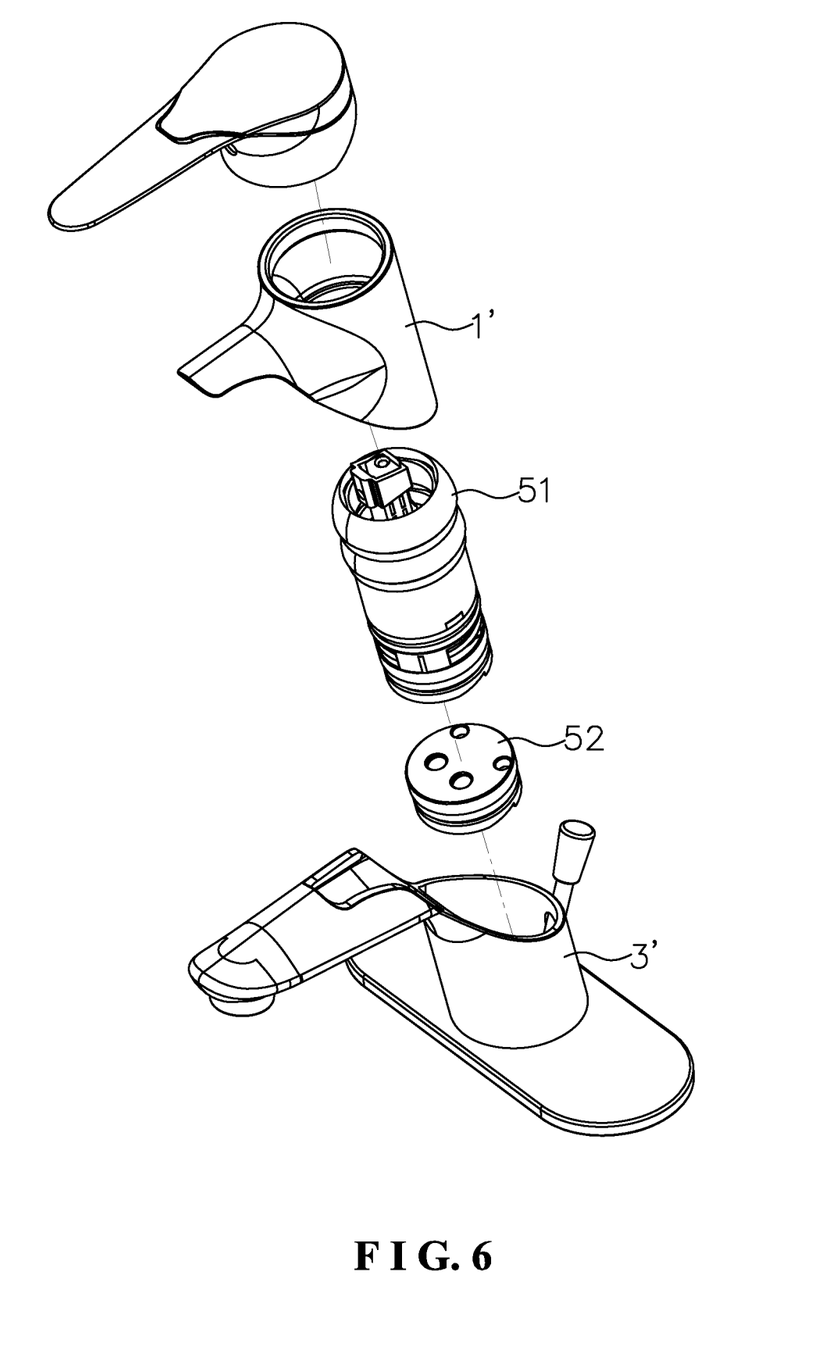
FIG. 6 is an exploded view according to a third embodiment of the present invention.
Figure 7:
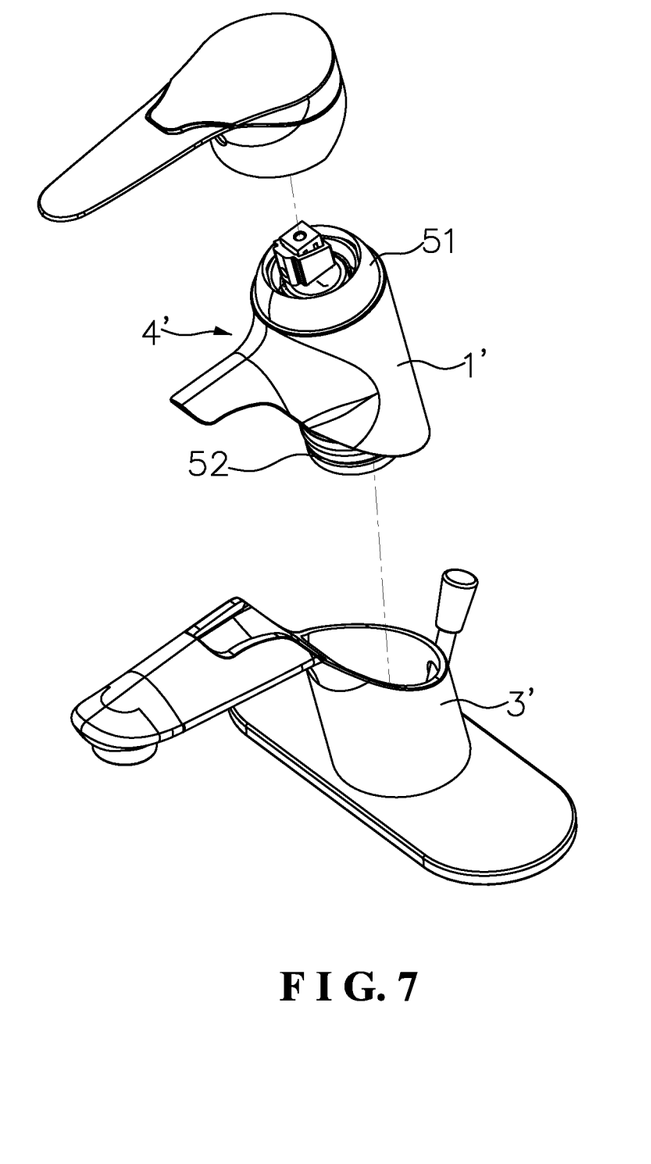
FIG. 7 is a partial assembled view according to the third embodiment of the present invention.
Figure 8:
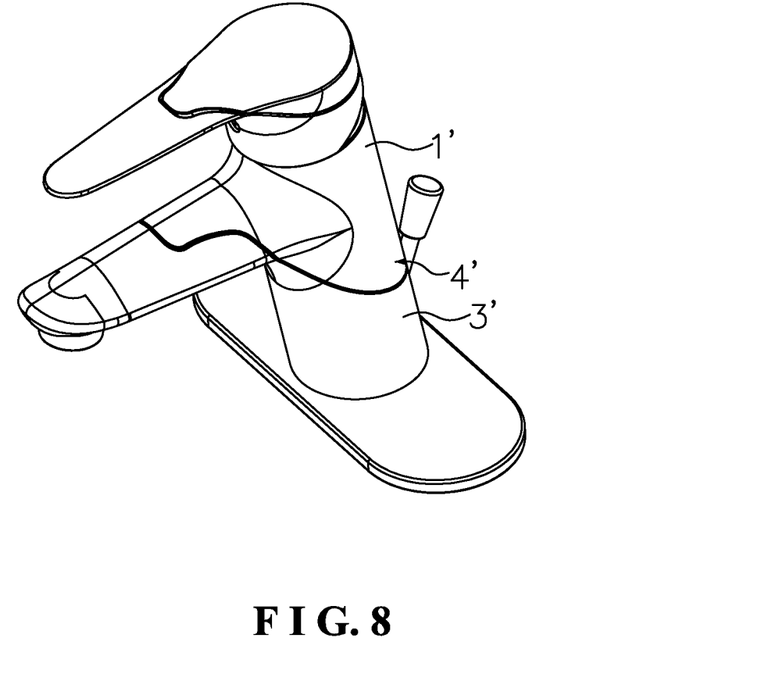
FIG. 8 is a perspective view according to the third embodiment of the present invention.

Furthermore, the second embodiment can be in cooperation with a conventional water tap valve core, as shown in FIG. 6 and FIG. 7. Conventional valve core members 51, 52 are assembled in the cartridge casing 1' to form a module 4'. The module 4' is assembled to the water tap 3' to constitute a complete water tap structure as shown in FIG. 8. The cartridge casing 1' corresponds in shape to the water tap 3' to form a smooth curve appearance to enhance the aesthetics and decoration.

In other words, the valve core members 51, 52 can be mounted in the cartridge casing 1' in advance to form the module 4'. The consumer can purchase the module 4' for installation or replacement. There is no need to assemble the valve core members 51, 52. Of course, the consumer can buy an assembled type, with the shape of the water tap 3' to mate with the module 4', for the consumer to install the cartridge type valve core smoothly. The present invention has great practicality.

Although particular embodiments of the present invention have been described in detail for purposes of illustration, various modifications and enhancements may be made without departing from the spirit and scope of the present invention. Accordingly, the present invention is not to be limited except as by the appended claims.

We claim:

1. A cartridge type valve core structure of a water tap, comprising: a cartridge casing having an accommodation room therein, the accommodation room extending through the cartridge casing to form openings, an outer wall the cartridge casing being provided with a first engaging portion for connecting the water tap; and a valve core disposed in the accommodation room of the cartridge casing through insertion through the openings of the cartridge casing and received into accommodation room, the valve core comprising a control end, a water inlet end, a water outlet end, and at least one water room, the control end, the water inlet end and the water outlet end being connected to the water room respectively, the control end extending out of the cartridge casing from a top end of the accommodation room, the water inlet end extending out of the cartridge casing from a bottom end of the accommodation room, the water outlet end extending out of the cartridge casing one side of the accommodation room; wherein the water tap is provided with a mounting space for the cartridge casing to be mounted therein, the mounting space being provided with a second engaging portion therein, the first engaging portion of the cartridge casing and the second engaging portion of the mounting space being a linearly-extending groove and a linearly-extending protrusion to engage with each other such that the protrusion and the groove are in linear slidable engagement with each other and the cartridge casing is movable from a position outside the mounting space to a position inside the mounting space through relative linear sliding movement between the protrusion and the groove.

2. The cartridge type valve core structure of a water tap as claimed in claim 1, wherein the mounting space is disposed at a rear side of the water tap.

3. The cartridge type valve core structure of a water tap as claimed in claim 1, wherein the valve core has two water rooms, the water inlet end being provided with two water inlet pipes connected to the two water rooms respectively, the two water inlet pipes being adapted to flow cool water and hot water, the control end being adapted to control the two water rooms to supply the cool water or hot water separately or to supply mixed water.

4. The cartridge type valve core structure of a water tap as claimed in claim 1, wherein the cartridge casing and the valve core are made of a nontoxic non-metal material.

5. The cartridge type valve core structure of a water tap as claimed in claim 1, wherein the cartridge casing is made of a transparent material.

6. The cartridge type valve core structure of a water tap as claimed in claim 1, wherein an outer surface of the cartridge casing is provided with an electroplating layer.

\* \* \* \* \*